3,222,782
CUTTING HEAD FOR HAIR CLIPPER
Stephen Sadlon, Racine, Wis., assignor to John Oster Manufacturing Co., Milwaukee, Wis., a corporation of Wisconsin
Continuation of application Ser. No. 251,956, Jan. 16, 1963. This application Feb. 5, 1965, Ser. No. 433,536
5 Claims. (Cl. 30—223)

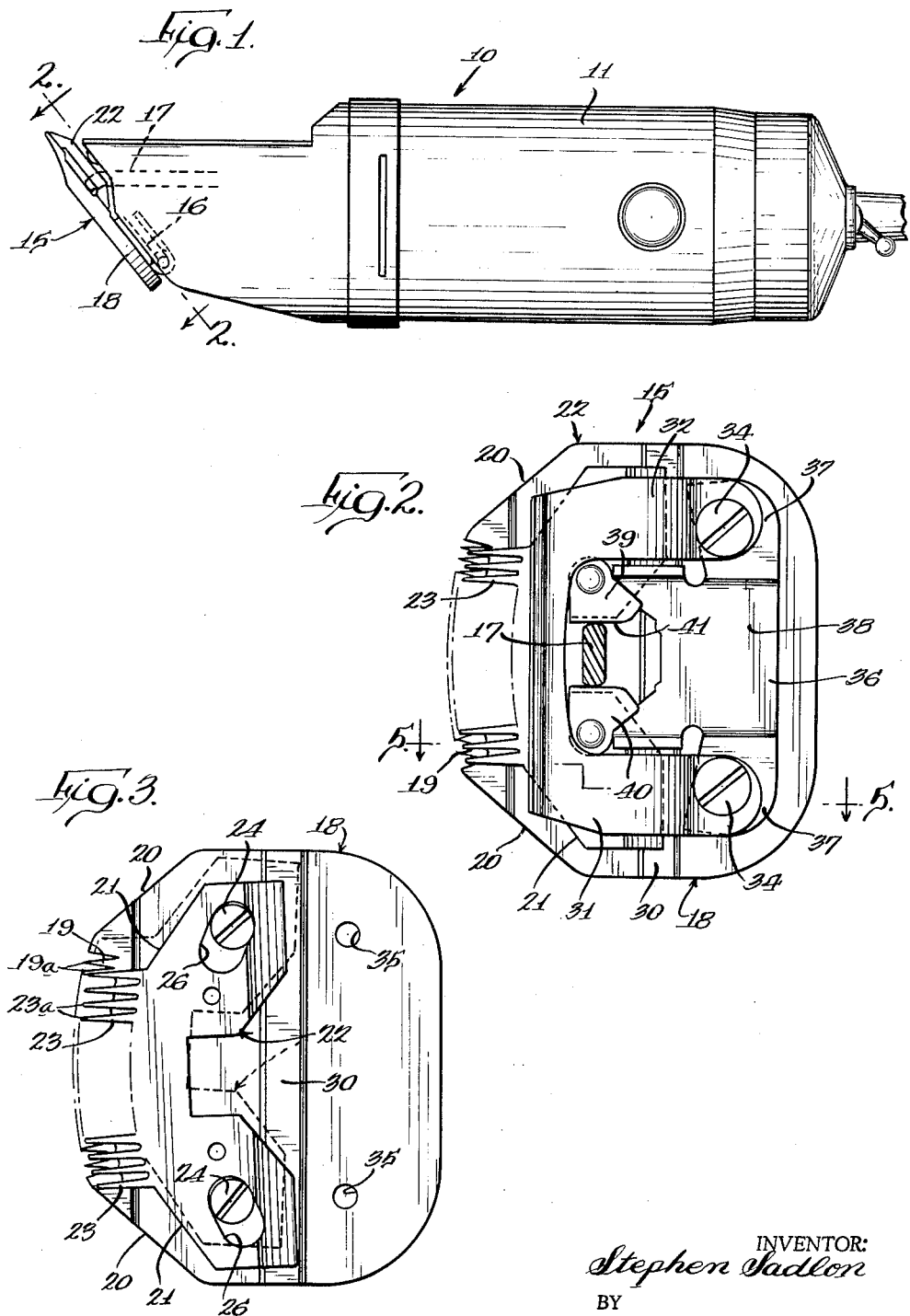

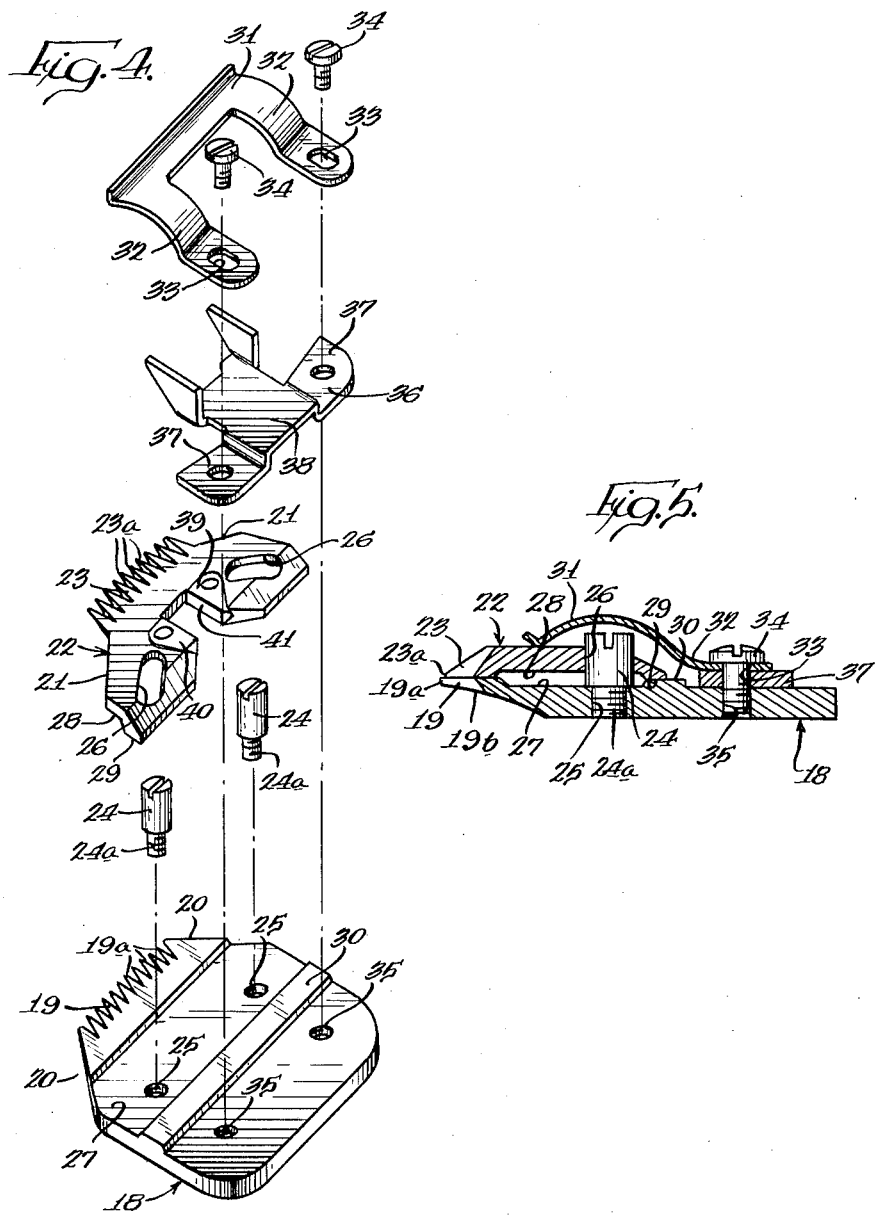

The instant application is a continuation of my earlier application Serial No. 251,956, filed January 16, 1963, now abandoned, and assigned to the same assignee as the instant application.

The present invention relates generally to hair clippers and more specifically to a shearing head or cutting assembly for use in a hair clipper.

There are available both hand operated and electrically operated clippers for use in cutting hair. Whether the clipper be hand operated or electrically operated, it conventionally includes a shearing head having a base plate or fixed cutter or blade and a movable cutter or blade mounted for reciprocating motion along a predetermined path in engagement with the fixed blade. The fixed and movable blades are provided with cooperating shearing teeth and are biased into engagement by means of a tensioning mechanism. A suitable driving mechanism is provided to slide the movable shear plate in its reciprocating movement against the fixed blade.

In the cutting of hair, it has been accepted practice to use a hair clipper of the type described above for shingling the hair on the neck and around the ears. Such clippers are not generally used for very close cutting of hair or for trimming the edge of the hairline around the sideburns, ears and the back of the neck. The shearing assemblies of the hair clippers are generally too bulky and unsuited to the very close hair cutting and finishing of the edges of the hair. It has been necessary for the barber to use a razor in cutting the hair very short on the neck and adjacent the ears. In addition, hand scissors are conventionally used to trim the edge of the hairline around the sideburns and the ears. It would be desirable to have a shearing assembly which could be used for all of the close cutting and scissor type trimming now done by the barber in giving a hair cut.

It is, therefore, an object of the present invention to provide an improved shearing assembly for use with electrically or hand operated hair clippers.

It is a further object of the present invention to provide a hair clipper shearing head which is adapted for finish cutting along the edge of the hairline and very close cutting around the neck.

It is an additional object of the present invention to provide a shearing assembly having the teeth arranged on a radius to facilitate trimming the hairline around the ears.

It is a further object of the present invention to provide a shearing assembly having a thin fixed shearing blade and movable shearing blade arranged to cut hair as close as with a razor.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is a side elevational view of a hair clipper to which is mounted a shearing head or assembly embodying the present invention;

FIG. 2 is a sectional view taken along line 2—2 of FIG. 1 showing the shearing assembly of the present invention;

FIG. 3 is a top plan view of the shearing assembly shown in FIG. 2 with portions thereof removed;

FIG. 4 is an exploded perspective view of the shearing assembly shown in FIGS. 2 and 3; and FIG. 5 is a sectional view taken along line 5—5 of FIG. 2.

The present invention relates to a hair clipper shearing head or assembly for use in fine trimming or short cutting of hair in connection with the giving of a hair cut. The shearing assembly includes a fixed bottom shearing plate having thin shearing teeth arranged along a curve to facilitate trimming the hairline around the ears. The movable shearing plate is formed with a row of teeth, the ends of which are also disposed along a curve and are positioned a slight distance back from the ends of the teeth on the fixed shearing plate. The movable shearing plate is guided for oscillation along a curve corresponding to the curve defined by the ends of the teeth by means of pins extending from the fixed plate into cooperating arcuate slots in the movable plate.

Referring to the drawings, there is illustrated a hair clipper generally designated at 10 which comprises an elongated housing 11 within which a suitable electric motor is mounted. At one end of the elongated housing 11, there is detachably mounted a shearing head or assembly 15. The manner in which the shearing head is assembled to the hair clipper 10 is completely described in Oster Patent No. 2,182,597.

Briefly the above-described Oster patent discloses a hinged tongue 16 which is mounted on the end of the hair clipper housing. The tongue 16 mounts the shearing head assembly 15 in operative engagement with an oscillating drive arm 17 as is best shown in FIG. 1. In the above-described Oster patent, the shearing head may be detached from the hair clipper by pivoting the shearing head assembly and the hinged tongue away from the hair clipper housing. The head assembly may then be simply slipped off of the tongue 16. It should be understood, however, that the shearing head might also be secured to the housing by means of screws or any other suitable assembly means. The instant invention relates solely to the structure of the shearing head and not to the manner in which it is assembled to the hair clipper.

The shearing head 15 includes a fixed or stationary shearing plate or blade 18 which is rigidly secured to the housing 11 by means of the above-described hinged tongue 16. The fixed shearing plate 18 is provided with shearing teeth 19 formed along the front edge thereof. The ends 19a of the shearing teeth are sharply pointed so as to move easily through hair being clipped. In addition, the ends 19a lie along a curved line as is best seen from FIGS. 2 and 3. The lower edges of the shearing teeth 19 are cut away at 19b so that they are extremely thin permitting the hair to be cut very short. With the teeth diminishing in thickness to between .015 and .020 inch at the other ends 19a, it has been found that hair can be cut almost as short as with a razor.

Adjacent the ends of the row of shearing teeth formed on the fixed shearing plate 18, there are provided angled portions 20 which slope sharply away from the area of the shearing teeth 19. The angled portions 20 permit the toothed area of the shearing head 15 to be moved into restricted areas while trimming around the ears without interference from the bulky edges which are normally found adjacent the toothed portion of the shearing head.

Mounted for operative engagement with the upper surface of the fixed shearing plate 18 is a movable shearing plate or blade 22 which is formed with outwardly projecting cutting teeth 23 formed along the edge thereof adjacent the shearing teeth 19 formed on the fixed shearing plate. To guide the movable shearing plate in its movement with respect to the fixed shearing plate 18, there are provided guide pins 24 which have threaded ends 24a adapted for threaded engagement with openings 25 formed in the fixed shearing plate 18. The guide pins 24 are received in arcuate slots 26 formed in the movable shearing plate 22. With the guide pins 24 received in the slots 26 of the movable shearing plate 22, ends 23a of the teeth 23 are positioned slightly rearwardly of the ends 19a of the lower shearing teeth. This relatively recessed position of the movable shearing teeth 23 is necessary to prevent irritation or cutting of the skin by the action of the two sets of shearing teeth. It should be appreciated that the slots 26 have the same center of curvature as the curves defined by the ends of the shearing teeth 19 and 23. Thus, as the shearing plate 22 is moved with respect to the shearing plate 18, the shearing teeth 23 on the movable shearing plate maintain the same spaced distance from the ends of the shearing teeth 19a on the fixed shearing plate.

To obtain a high unit pressure between the shearing blades in the area of the teeth, the lower blade 18 and the upper blade 22 are formed with transversely extending slots 27 and 28, respectively, as are best shown in FIGS. 4 and 5. The movable shearing plate has a rib 29 defining the rear edge of the channel 28 which rib is ground to the same plane as the shearing teeth 23 and which abuts a corresponding rib 30 on the lower blade 18. The actual engagement of the two shearing plates is, therefore, limited to the area of the teeth and the portion immediately adjacent thereto as well as the rib 29 and the abutting rib 30 on the stationary shearing plate 18. For the purpose of reducing the weight of the blade 22 to a minimum and minimizing the possibility of the side of the blade 22 interfering with the operation of the clipper, cut away portions or notches 21 are provided on blade 22 at both ends of the row of teeth 23.

To bias the movable blade 22 into contacting engagement with the fixed blade 18, there is provided a biasing spring 31. The spring 31 includes a pair of rearwardly extending mounting legs 32 which have openings 33 formed therein to receive assembly screws 34. The assembly screws 34 are screwed into threaded openings 35 in the fixed shearing blade 18.

Also clamped in position by means of the assembly screws 34 is an assembly yoke 36 which includes legs 37 which are received under the biasing spring 31 and clamped against the fixed shearing plate 18. The assembly yoke 36 has a central channel portion 38 which cooperates with the shearing plate 18 to form an elongated recess within which the hinged tongue 16 is received to assemble the shearing head 15 to the clipper housing 11.

In considering the manner in which the shearing head 15 operates, it should be understood that the drive arm 17 is conventionally a lever which oscillates about a pivot point within the clipper housing 11 and which has an exposed end protruding from the housing for engagement with the movable shearing plate 22. The shearing plate 22 is formed with a pair of wear bushings 39 and 40 riveted to the edges of a slot 41 formed in the shearing plate 22. The bushings 39 and 40 are formed of hardened steel and are intended to lessen the wear between the drive arm 17 and the movable shearing plate 22. This is particularly necessary since the shearing plate 22 oscillates about a different axis and in a different plane than does the drive arm 17. There is, therefore, some sliding engagement between the drive arm 17 and the wear bushings 39 and 40.

The radius of curvature of the rows of teeth on the shearing blades 18 and 22 have been selected to adapt the shearing head 15 to the specific task of trimming the hairline around the neck and ears. Through the use of the guide pins 24 operating in the arcuate slots 26, a simple compact arrangement has been provided to restrict movement of the shearing blade 22 to the same arc as is defined by the shearing teeth 19 and 23. By having the opposed surfaces of the shearing blades 18 and 22 cut away by the channel portions 27 and 28, wear is reduced to a minimum, the sharpening of the blades is considerably simplified and the movement of the shearing blade 22 along the arcuate path is easily accomplished by means of the guide pins 24.

In FIG. 3, there is shown the relative positions of the shearing blades 18 and 22 at the maximum extent of movement by the blade 22 in either direction. The solid line showing of the movable blade 22 illustrates the movement in one direction while the dotted line showing illustrates its position at the other end of its arcuate path. As is easily seen in FIG. 3, the movable shearing teeth 23 are always in engagement with the fixed shearing plate 18. The beveled or angled portions 20 of the fixed shearing plate 18 are provided to facilitate application of the shearing teeth in restricted areas along the hairline while still affording protection from engagement with the reciprocating edge of the movable shearing blade 22. It should be noted that the notched portions 21 in the movable shearing blade 22 are of such extent to maintain the moving blade always well within the outline of the fixed blade 18. The reason for this arrangement is so that when the shearing assembly 15 is used to trim the hairline behind the ears, there is no possibility of injury from engagement of the side of the moving cutter 22 against the ear of the person whose hair is being cut.

It should be apparent from the foregoing description that the shearing head 15 comprising the invention provides a simple solution to a trimming and shaving problem which has required barbers to use razors and scissors in the finish trimming of hair for many years. The shearing head 15 which may be readily assembled to existing hair clippers permits the barber to perform additional operations quickly and more effectively with the hair clipper.

The arcuate shape of the rows of teeth on the shearing blades has been found necessary for finish trimming of the hairline. The reduced width of the toothed area accompanied by the narrowing of the assembly back from the teeth permits use of the new shearing head on the hairline in the restricted space available around the ears.

Finally the guide pins 24 operating in arcuate slots 26 provide a simple and effective means of guiding the cutter blade 22 along the selected arcuate path which is in a different plane from the plane of oscillation of the drive arm.

While there has been shown and described a particular embodiment of the invention, it will be obvious to those skilled in the art that changes and modifications may be made without departing from the invention, and that it is intended in the appended claims to cover all such changes and modifications as fall within the true spirit and scope of the invention.

What is claimed as new and desired to be secured by Letters Patent of the United States is:

1. A blade set for use on a hair clipper comprising a stationary blade which is adapted to be easily attached on the hair clipper, said blade defining a row of teeth on its front edge with the tips of the teeth lying along a curve, said row of teeth occupying a substantially reduced portion of said front edge, said blade front edge including large angled portions on each side of said row of teeth which slope sharply away from said teeth whereby the blade narrows considerably at the row of teeth, a movable blade adapted to overlie said stationary blade and defining a row of cutting teeth with the tips of the teeth lying along a curve corresponding to the curve defined by said stationary blade teeth tips, means including guide pins and arcuate slots on said blades and interrelating said blades to guide said movable blade along an arcuate path corresponding to the curve of said rows of teeth, said means solely determining the arcuate path of said movable blade.

2. The blade set of claim 1 wherein said stationary blade row of teeth is approximately one-half the length of said front edge.

3. The blade set of claim 1 wherein said guide pins extend upwardly from said stationary blade and are received in said arcuate slots which are defined in said movable blade, said movable blade slots having the same center of curvature as the curve defined by the tips of said teeth.

4. A blade set for use on a hair clipper comprising a stationary blade defining a row of teeth on the front edge with the teeth tips lying along a curve, said front edge including large angled portions on each side of said row of teeth which slope sharply away from said teeth whereby the row of teeth occupies a substantially reduced portion of said front edge, said teeth having lower edges which are cut away near the tips so that they are extremely thin whereby hair may be cut very short, a movable blade adapted to overlie said stationary blade and defining a row of cutting teeth with the tips lying along a curve corresponding to the curve defined by said stationary blade teeth tips, means on said blades to guide said movable blade along an arcuate path corresponding to the curve of said row of teeth, said movable blade teeth tips being positioned slightly behind said stationary blade teeth tips, said means solely determining the arcuate path of said movable blade.

5. The blade set of claim 4 wherein said stationary blade teeth tips lie along a curve which approximates the curve of a person's hairline behind the ears.

References Cited by the Examiner

UNITED STATES PATENTS

| Re. 16,000 | 2/1825 | Jordan | 30—223 X |
|---|---|---|---|
| 625,102 | 5/1899 | Ferland | 30—201 |
| 1,489,198 | 4/1924 | De Vincenti | 30—201 |
| 1,723,323 | 8/1929 | Bartlett | 30—223 |
| 1,956,042 | 4/1934 | Oster | 30—221 |
| 3,101,535 | 8/1963 | Andis | 30—223 X |

WILLIAM FELDMAN, *Primary Examiner.*